United States Patent [19]
Tsuda

[11] 3,946,989
[45] Mar. 30, 1976

[54] SLOW DESCENDER INCLUDING FLUID AND MECHANICAL BRAKING DEVICES

[76] Inventor: Masao Tsuda, No. 12-10, Chuo Honcho 1-chome, Adachi, Tokyo, Japan

[22] Filed: Dec. 17, 1974

[21] Appl. No.: 533,686

Related U.S. Application Data

[62] Division of Ser. No. 360,067, May 14, 1973, abandoned.

[30] Foreign Application Priority Data

| May 22, 1972 | Japan | 47-49935 |
| Dec. 23, 1972 | Japan | 48-2264 |
| Dec. 23, 1972 | Japan | 48-2265 |
| Jan. 18, 1973 | Japan | 48-7379 |
| Feb. 8, 1973 | Japan | 48-15150 |

[52] U.S. Cl. ................ 254/157; 182/5; 188/65.3; 188/271; 188/290; 188/291; 188/292; 188/185; 254/160
[51] Int. Cl.² .................................... B66D 5/04
[58] Field of Search ......... 188/65.3, 271, 291, 292, 188/290, 184, 185; 254/157, 158, 159, 160; 192/12 A; 182/5

[56] References Cited
UNITED STATES PATENTS

| 531,567 | 12/1894 | Roper | 254/158 |
| 1,303,460 | 5/1919 | Cain | 188/185 |
| 2,484,913 | 10/1949 | Snell | 192/12 A |
| 3,172,626 | 3/1965 | Haber et al. | 188/271 X |
| 3,188,052 | 6/1965 | Longworth | 254/157 |
| 3,259,213 | 7/1966 | Daniels et al. | 188/271 |
| 3,760,910 | 9/1973 | Koshihara | 254/157 X |

FOREIGN PATENTS OR APPLICATIONS

| 290,412 | 8/1953 | Switzerland | 188/292 |

*Primary Examiner*—George E. A. Halvosa
*Attorney, Agent, or Firm*—Wenderoth, Lind & Ponack

[57] ABSTRACT

A slow descender includes a rope pulley and a braking apparatus which restricts the rotation speed of the rope pulley. The braking apparatus includes a mechanical braking device containing a centrifugal brake which has centrifugal weights, a V-shaped lining part cooperating with the weights, and a speed multiplying gearing device connecting the rope pulley and the centrifugal friction brake. The slow descender further includes an oil hydraulic braking device of the vane pump type or of the inscribed gear pump type.

6 Claims, 21 Drawing Figures

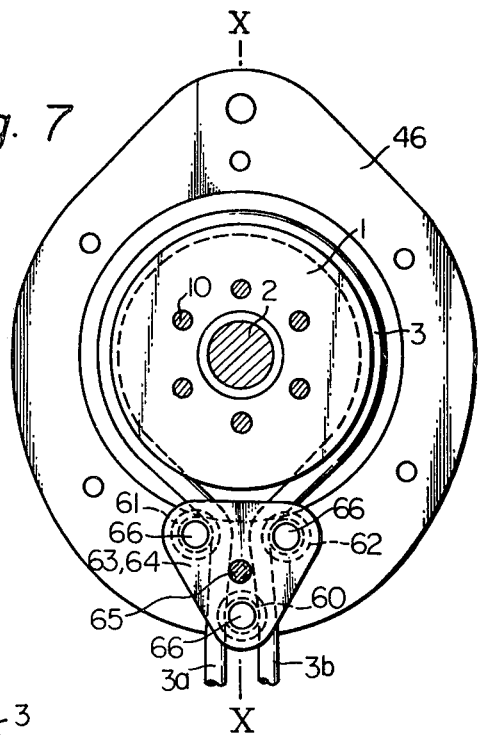
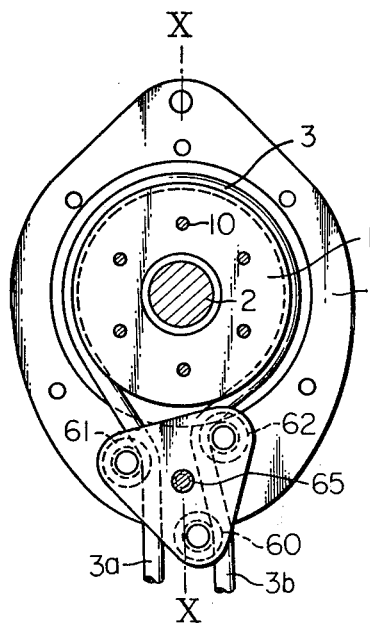

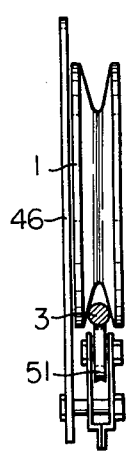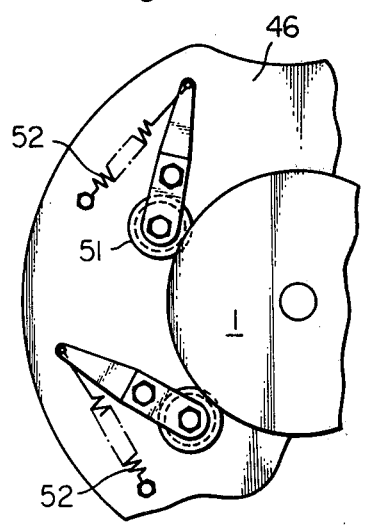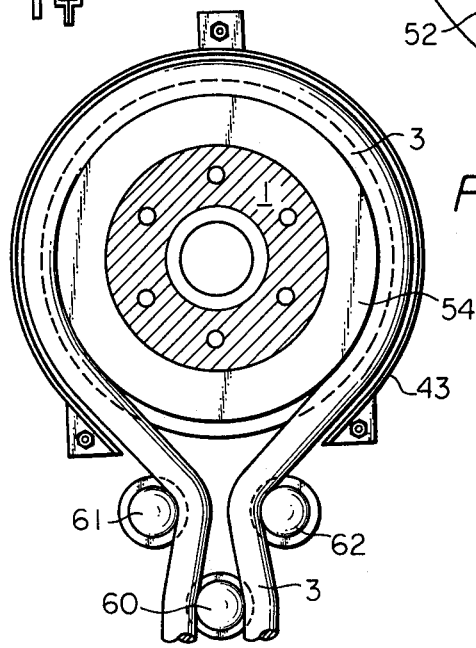

SLOW DESCENDER INCLUDING FLUID AND MECHANICAL BRAKING DEVICES

This is a division of application Ser. No. 360,067, filed May 14, 1973, now abandoned.

BACKGROUND OF THE INVENTION

This invention relates to a slow descender, especially to a slow descender which is suitable for use by people for the purpose of descending from a height.

In case of a fire in a high-storied building, up to this time, people often were burned to death by flames, suffocated to death by smoke or they leaped to death from the building.

Even in a building equipped with an emergency staircase, it does not always follow that all the people can successfully escape from fire. Moreover, although equipment such as relief bags, rope ladders and so on, have been proposed for use, they are not suitable for use in high-storied buildings.

A slow descender enables men to descend from a height safely and, thus, it can act as a useful safety device. However, slow descenders which have been heretofore proposed have many defects. For example, the descending speed thereof sometimes exceeds the safe speed, the rope is apt to be soon worn and torn, and two or more persons cannot descend simultaneously.

Specifically, it is difficult or impossible that the slow descenders heretofore proposed are satisfactory in emergency circumstances.

SUMMARY OF THE INVENTION

An object of this invention is to provide a slow descender with which people can descend from a height with safety, reliability and ease.

Another object of this invention is to provide a slow descender in which the abrasion of a rope coating is diminished to the minimum.

A further object of this invention is to provide a slow descender which is remarkably safe, and on which many persons can descend simultaneously equipping it with both centrifugal friction brakes and rotary oil-hydraulic brakes.

According to this invention, there is provided a slow descender, which comprises a rope pulley, brakes which restrain the rotating speed of the rope pulley, a rope guide device which guides a rope around the rope pulley and includes a pair of small guide pulleys arranged adjacent to each other and to the circumference of the rope pulley, at least one of the pair being movable in such a direction that it moves apart from the vertical line of the slow descender in case a load is applied to it.

In a preferred embodiment of this invention, the braking apparatus comprises a centrifugal friction braking means connected with the rope pulley through a mechanical connection device, and a rotary oil-hydraulic braking means connected with the rope pulley directly or through a clutch device.

It is desirable that the clutch device engages when a predetermined rate of rotation of the rope pulley is reached and that it disengages when the rate of rotation decreases to below the predetermined value.

Preferably the mechanical connection device comprises a two stage speed multiplying gearing or a planetary speed multiplying gearing.

And it is advisable that the oil-hydraulic braking means is to be of a vane pump or of an inscribed gearing pump, which generates oil-hydraulic pressure within a hermetically sealed chamber.

The slow descender can be made remarkably compact in its general arrangement by positioning the mechanical braking means and the oil-hydraulic braking means so that the rope pulley is interposed between them.

In this case, the rope pulley is supported on both sides and the weight of the two braking means is prevented from being unbalanced. Therefore the harm to the rope which is apt to occur when the means are inclined can be prevented and, further, dual safety is secured by using both the oil-hydraulic braking means and the mechanical braking means.

The oil-hydraulic braking means can be of any optional and convenient type of oil-hydraulic pump — for example, a vane pump, a gear pump, a piston pump etc. In case a piston pump type is used, in order to prevent variation of the driving torque, so many pistons must be provided that the construction of the equipment becomes complicated. Accordingly, a gear pump, especially an inscribed gear pump or a vane pump is advisable. The pump is used to compress hydraulic oil enclosed within a hermetically sealed space and to make it circulate within the space. The compressed oil-hydraulic fluid moves recurrently by its internal leakage within the pump chamber, or otherwise desirably through a passage connecting a high pressure section and a low pressure section within the pump chamber. In the latter case, the passage can be provided with an adjustable flux restricting valve. As the oil-hydraulic fluid is enclosed within the hermetically sealed space, there is no fear that the oil might deteriorate and it can be expected that the complete availability of the slow descender as an emergency apparatus is maintained over a long period.

The mechanical braking means should be constructed so that friction elements or centrifugal weights which rotate together with a rotor are urged against friction pads disposed on the inner circumference of a housing by their own centrifugal force and thereby generate a friction braking power.

As the mechanical braking means preferably has a mechanical speed multiplying device such as a planetary multiplying gearing or a two-stage multiplying gearing and the centrifugal weights or friction elements, it can actuate the friction elements at a fast rotating speed by multiplying the rotating speed of the rope pulley, and in this case only a small torque is needed for friction braking. Accordingly, with the mechanical braking means, accurate control of the rotating speed of the rope pulley can be achieved.

Furthermore, the mechanical speed multiplying device, unlike other forms of speed multiplying devices, prevents an unsure operation of the speed multiplying device owing to slip or disengagement or the like. In the centrifugal braking means in which the friction elements are urged against the friction pads by centrifugal force, the braking power is proportional to the square of the rotation speed, and accordingly when the speed increases, the braking power rapidly increases, and the slow descender is thus provided with sufficient safety.

As a speed multiplying device, a planetary gearing of a type which comprises a large planetary gear connected with the rope pulley, plural intermediate gears mounted on fixed shafts, and a sun gear connected with a centrifugal braking device can perform a powerful load transmission accurately, and does not cause any vibration.

A two-stage speed multiplying gearing which comprises a spur gear connected with the rope pulley, a dual spur gear rotating around an immobile shaft, and a spur gear connected with the centrifugal braking equipment, has a simple construction, and moreover, can transmit a sufficiently strong power for a slow descender. Accordingly, they can be utilized for a slow descender of a simplified type which will be described later.

In addition, by means of actuating the oil-hydraulic braking means through a clutch device, the system can be configured such that in case of a light load or a slow speed, only the mechanical braking means operates, and in case of a heavy load or a high speed, both braking means operate. Accordingly, in an emergency, several persons descend simultaneously and thus the slow descender has remarkably increased its performance capabilities.

Furthermore, in another disclosed embodiment of this invention, it is possible to substitute a rotary oil-hydraulic braking means for the centrifugal friction braking means which is connected with the rope pulley through a mechanical connection device.

Generally it can be said that a centrifugal friction braking means provides sufficient braking power only for a light load, but that an oil-hydraulic braking means provides a strong braking power for a heavy load.

In case of using the slow descender under severe cold conditions, the viscosity of the hydraulic oil in the oil-hydraulic braking means is increased and an early descending speed under a light load is apt to be slow and accordingly it is advisable to use a slow descender having the oil-hydraulic means and the centrifugal friction braking means together. However in case of descending in a warm climate it is possible to use a slow descender having two sets of rotary oil-hydraulic braking means. Thus it will have no effect on the performance of the slow descender.

To simplify this invention, either the oil-hydraulic braking means or the mechanical braking means can be omitted. In such a way a slow descender can be made so compact and inexpensive, that a fire brigade or a mountain rescue party is able to carry it along in their rescue mobilization.

The foregoing and other objects of this invention, which will become more fully apparent from the following detailed description, may be achieved by means of the apparatus depicted in and set forth in this specification in connection with the accompanying drawings.

DETAILED DESCRIPTION OF THE DRAWINGS

FIG. 7 is a section along line C—C of FIG. 1, viz. a side view which shows the relative positions between a rope pulley and rope guide pulleys when no load is applied.

FIG. 8 is a view similar to FIG. 7, but showing the situation in which the rope guide pulleys are swayed by a load applied to the rope.

FIG. 9 is a partial elevational view, showing rope holding rollers.

FIG. 10 is a side view, showing the rope holding rollers of FIG. 9.

FIG. 11 is a side view which shows a guide plate for preventing the jumping up of the rope.

DESCRIPTION OF PREFERRED EXEMPLIFICATION

Figure 1:
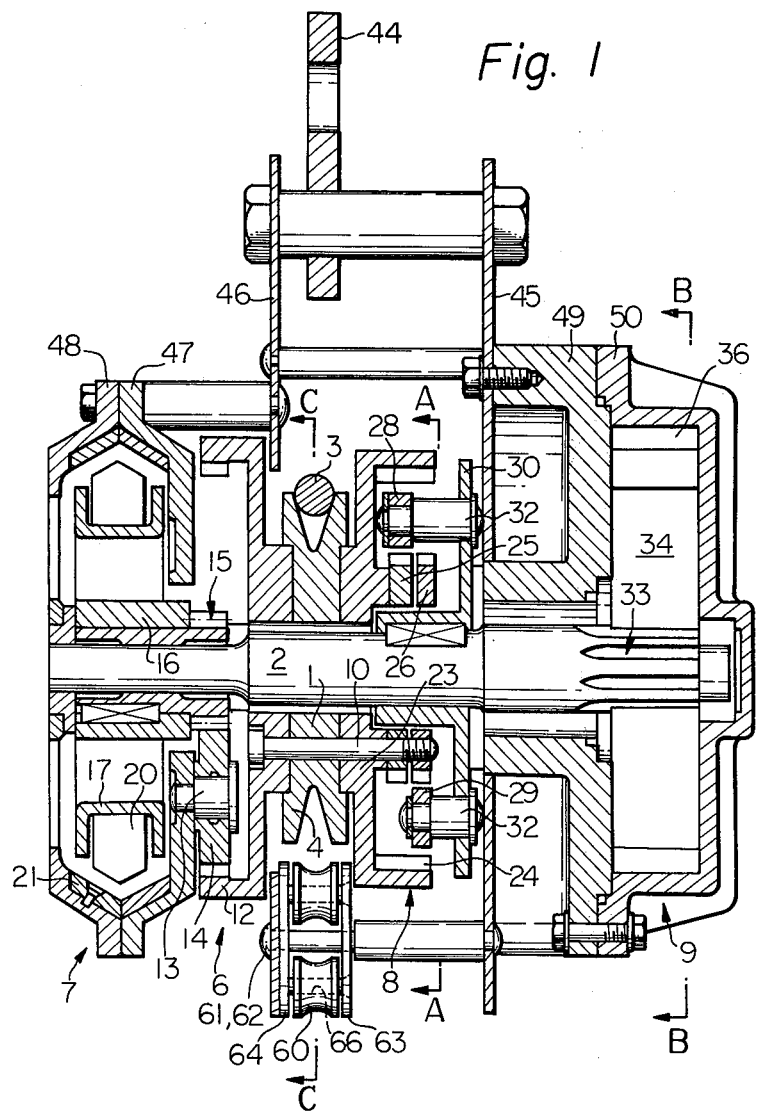
FIG. 1 is a vertical section of view of a slow descender shown as a first embodiment of this invention.

Referring now to the accompanying drawings, especially FIG. 1, 1 denotes a rope pulley rotatably supported on a shaft 2 which is rotatably mounted within a casing.

On the periphery of the rope pulley, a V-shaped groove 4 is formed for receiving a rope 3.

The rope pulley 1 is, on the left side of FIG. 1, connected with a centrifugal, mechanical friction braking means 7 through a mechanical connective device 6 which is shown as a planetary speed multiplying gearing. As shown on the right side of FIG. 1, the rope pulley is also connected with an oil-hydraulic braking means 9 through a clutch 8.

Figure 2:
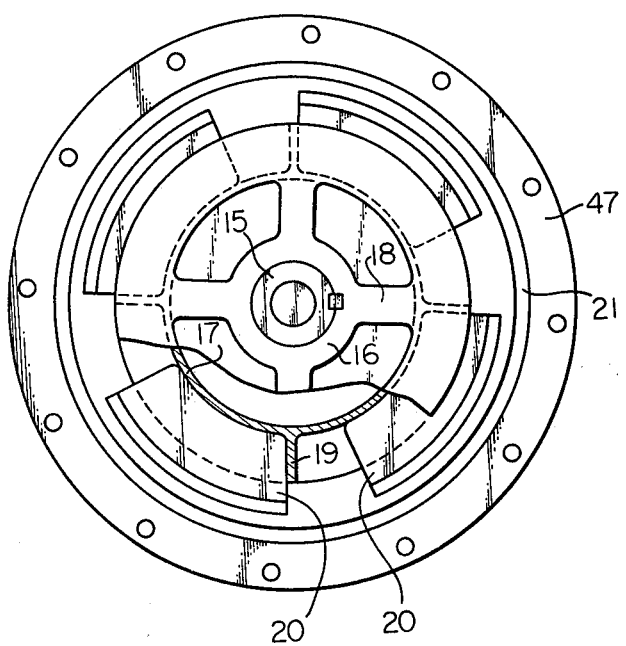
FIG. 2 is a partially cut-away left side view of FIG. 1 which shows a mechanical braking means.

The planetary speed multiplying gearing comprises a large planetary gear 12 fixed to the pulley 1 with bolts or pins 10, three intermediate planetary gears 14 which are rotatably supported with immovable shafts 13 and engaged with the gear 12, and a sun gear 15 which is rotatably supported with the shaft 2 and engaged with the gears 14. The hub portion of the sun gear 15 is extended toward the left side of FIG. 1 and connected with a rotor 16 of the mechanical friction braking means 7 by a key. The rotor 16 is generally formed so that it has wide trenches 17 opening radially outwardly between its circumferential flanges which are connected wiith the boss portion of the rotor by ribs. Within the circumferential trenches plural weights 20 are provided. Each weight is separated from the others by radially extending walls 19 of the rotor 16 (Ref. FIG. 2). The weights 20 are freely movable in the radial direction within the circumferential trenches 17, but their movement in the circumferential direction is restricted by the walls 19. A friction lining or pad 21 which cooperates with the weights 20 is secured on the interior wall of housings 47, 48 and when the weights 20 move outwardly in the radial direction by a centrifugal force, they engage the friction lining 21 and a braking resistance is given to the pulley 1 through the weights 20, the walls 19, the key between the rotor 16 and the gear 15, and then via the planetary gearing 6.

Figure 3:
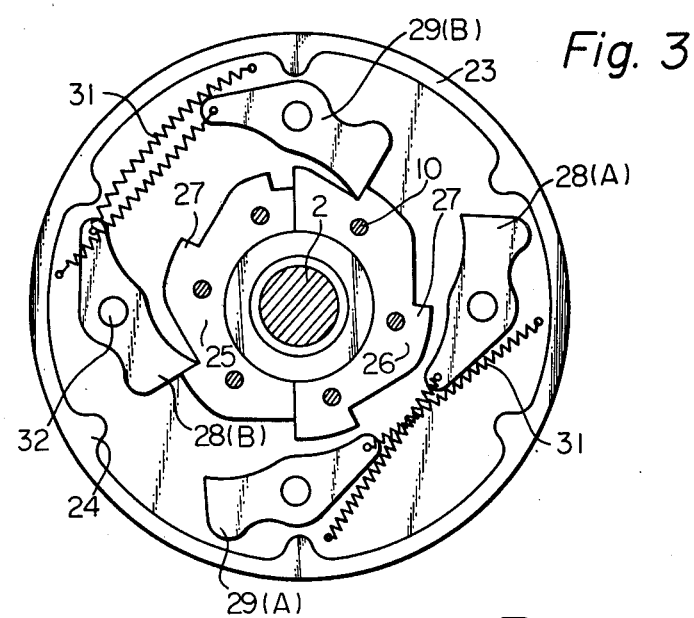
FIG. 3 is a section along line A—A of FIG. 1, illustrating the clutch device, in which the left half of one of the hooked discs 26 and the associated parts are cut away and some parts have been removed for the sake of clearness.
Figure 4:
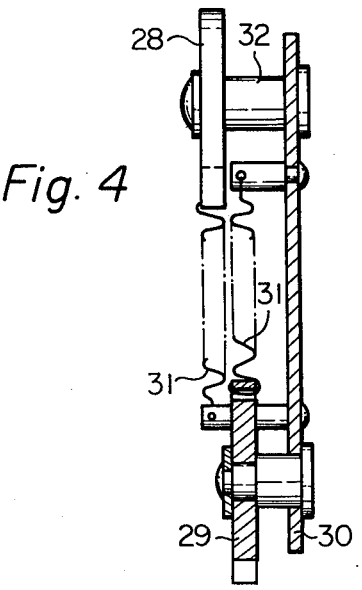
FIG. 4 is a partial elevational view, illustrating the swaying claws and the associated parts of the clutch.

Now referring to FIGS. 1, 3 and 4, a driving plate 23 of the clutch device 8 is fixed to the pulley 1 with pins or bolts 10 and is adapted to rotate together with the pulley 1. The driving plate 23 is a generally cup-shaped member and on its interior periphery projections 24 are formed and project inwardly in the radial direction. To the driving plate 23 two hooked discs 25, 26 are fixed to form a unitary member.

Half of each of the hooked discs 25, 26 are shown in FIG. 3, and driving hook portions 27 of each of the discs are faced to those of the other disc, namely, they are arranged in opposite directions.

According to the rotation direction of the pulley 1, either of the discs 25, 26 actuates the oil-hydraulic braking means to rotate through swaying claws 28 or 29, which will be detailed subsequently. Faced to the driving plate 23, a sub-cooperating plate 30 is fixed to the shaft 2 with a key or other convenient means and rotates together with the shaft 2.

As shown in FIGS. 3 and 4, swaying claws 28, 29 are movably fixed on the sub-cooperating plate 30, and in the engaging positions shown as 28B, 29B in FIG. 3, the swaying claws 28, 29 are engaged with the driving hooks 27 on the hooked discs 25, 26. Usually, however, the claws 28, 29 are biased by springs 31 in the positions shown as 28A, 29A in FIG. 3. When the driving plate 23 rotates, the projections 24 strike against the swaying claws 28, 29 and make them sway, and when the rotation speed of the pulley 1 becomes fast enough, the extent of their swaying also increases to an extent that the swaying claws 28, 29 become engaged with the hooks 27 on the disc 25, or 26 as is shown in 28B or 29B, and thus the rotation of the pulley 1 is transmitted to the sub-cooperating plate 30 through the swaying claws 28 or 29. When the rotation speed of the pulley 1 is lowered, the springs 31 are actuated to disengage the swaying claw 28 or 29 from the members 25 or 26.

Figure 5:
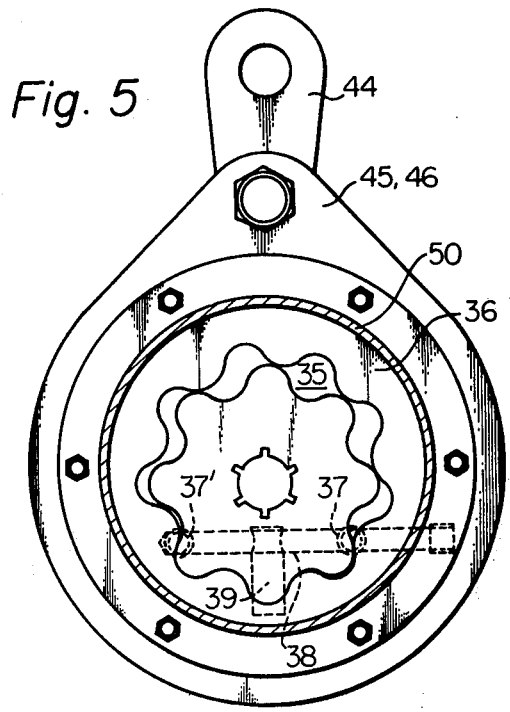
FIG. 5 is a section along line B—B of FIG. 1.
Figure 6:
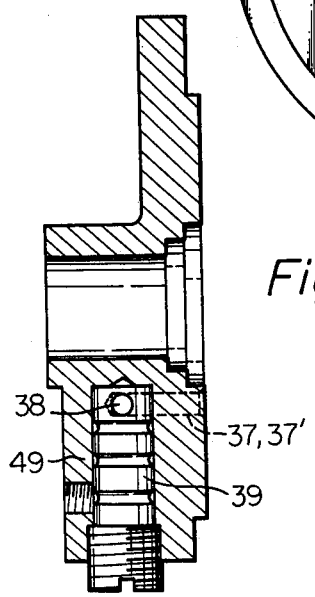
FIG. 6 is a detailed drawing which shows the arrangement of the control valve of FIG. 5.

At the right end of the shaft 2, the oil-hydraulic braking means 9 is connected through a spline 33. The oil-hydraulic braking means shown in FIGS. 1, 5 and 6 is of an inscribed gear pump type and comprises a rotor 34 which is fixed to the shaft 2 and rotated, and an eccentric ring 36, the inner periphery of which constitutes an oil-hydraulic chamber 35 between the periphery of the rotor. The eccentric ring 36 can be rotated eccentrically relative to the shaft 2 within a housing 50. In the oil-hydraulic chamber 35, suitable hydraulic oil is enclosed.

When the rotor 34 rotates, within the oil-hydraulic chamber, a high pressure section and a low pressure section are created, and by means of controlling the communication between the high pressure section and the low pressure section, the oil-hydraulic braking power can be regulated.

For this purpose passages 37, 37' are provided in the axial direction, a passage 38 is provided in the tangential direction and a controlling valve 39 is also provided. By turning the valve 39, the flow rate of the oil-hydraulic fluid flowing through the passage 38 can be controlled and thereby the braking power generated by the oil-hydraulic braking means 9 can be controlled.

Figure 12:
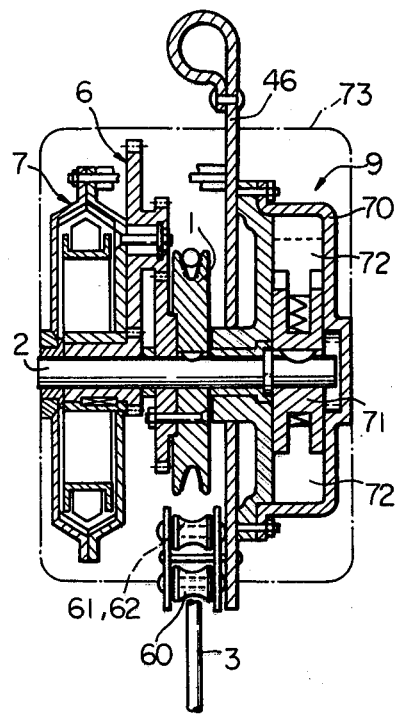
FIG. 12 is a drawing which shows a second embodiment of this invention in such a form that the mechanical speed multiplying device is made as a two-stage spur gear speed multiplying device, the oil-hydraulic means is of the vane pump type and the clutch device is omitted.

FIG. 7 is a partially broken-away drawing showing the arrangement of the rope pulley 1 and small rope guide pulleys 61, 62. A rope 3 wound about the periphery of the rope pulley 1 is guided by the small guide pulleys 61, 62 and another pulley 60, which are shown in the drawing. The pulleys 60, 61 and 62 are rotatably supported between common supporting plates 63, 64 with pins 66, and the supporting plates 63, 64 and the pulleys 60, 61, 62 are swingably pivoted on one or both of supporting plates 45, 46, (Ref. FIGS. 1 and 12) with a pin 65.

When a load is applied to the rope 3, the rope 3a on the side where the load is applied, swings the supporting plates 63, 64 and the pulleys 60, 61, 62 in the counterclockwise direction around the pin 65 (Ref. FIG. 8), and the pulley 61 moves in a direction away from the vertical line and moves away from the center of the pulley 1. Consequently, the curvature of the rope 3a around the pulley 61 is decreased and the service life of the rope will be remarkably prolonged. A result of tests carried on with a slow descender of the type shown in FIGS. 7 and 8, where the small guide pulleys 61, 62 are arranged in this manner, the life of the rope until it was worn, turned out to be increased more than three times, compared with the result when using a machine of the type in which the positions of the pulleys are fixed. These results were recorded when the tests were carried out using a wire rope having a core diameter of 5 – 6 mm and coated with entwined cotton yarn (with a diameter of 10 – 12 mm).

In arrangement of FIG. 8, the distance between the rope 3a and the rope 3b will increase when the load is applied, which will also be effective in avoiding entanglement between the rope positions 3a, 3b.

In FIGS. 1, 7 and 8, the pulleys 60, 61, 62 are supported by the common supporting plates 63, 64 and swing around the pin 65. When the load is applied, the pulley 62 moves in a direction approaching to the vertical line X—X of the machine and the pulley 1, and the curvature of the rope 3b around the pulley 62 increases, namely, owing to the movement of the pulley 62, the contact angle between the rope 3b and pulley 1 becomes increased. Subsequently this will compensate for the decrease in the contact angle between the rope on the 3a and the pulley 1.

The pulley 60, 61, 62 are shown as mounted on common supporting plates 63, 64. Nevertheless it can be so arranged that the pulleys are supported respectively in an independent way, and in response to the actuation of a load upon the rope, the pulley 61 or 62 moves in the direction away from the vertical line X—X. For example, the pulleys 61, 62 can be respectively supported on a swingable lever loaded with a spring.

FIGS. 9 and 10 show rope holding rollers 51 disposed close to the circumference of the pulley 1, for reducing relative slipping between the pulley 1 and the rope 3 to substantially zero. In this case, it is desirable that one or more pairs of the rope holding rollers 51 be respectively biased against the rope 3 with springs 52.

Alternatively, as shown in FIG. 11, it is possible to provide a guide plate 43 which prevents the jumping up of the rope, but unlike the illustration shown in FIGS. 9 and 10, the guide plate 43 does not function to prevent relative slipping between the rope and the pulley. In FIG. 1 the numeral 44 is a hook for a slow descender to be installed in an appropriate place, and 45, 46, 47, 48, 49 and 50 are immobile members constituting a housing. Additionally, various other bearings, keys, bolts, nuts, packings, guard covers and so on are appropriately disposed, but the explanation of them will be omitted.

Figure 13:
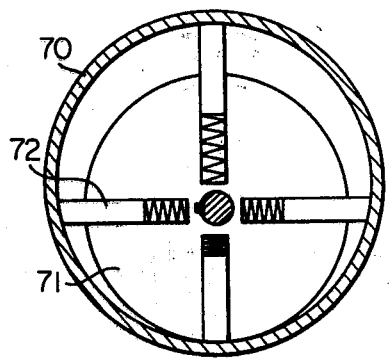
FIG. 13 is a partial section along line B—B of FIG. 1 and shows another embodiment of an oil-hydraulic section in addition to the one shown in FIG. 5.

FIGS. 12 and 13 depict a second embodiment of this invention. The rope pulley 1 actuates a centrifugal friction braking means 7 through a mechanical connecting device 6, which is shown as a two-stage spur gear speed multiplying device, and further, the rope pulley 1 directly drives an oil-hydraulic braking means 9 of a vane pump type through the shaft 2 which is fixed to both of the means 7, 9 with respective keys.

The oil-hydraulic braking means comprises a housing 70 which defines an eccentric pump chamber, a rotor 71 which is fixed to the shaft 2 with a key, and pistons, viz. vanes 72 which are mounted on the rotor 71 and move in a sliding manner in the radial direction. In the pump chamber, a suitable hydraulic oil is enclosed. When the rotor is rotated within the pump chamber, a high pressure section and a low pressure section are created and a braking force is produced. A valve, corresponding to the valve 39 explained in relation to the first embodiment, may be provided between the above high pressure section and the above low pressure section, thereby controlling the braking power.

Furthermore, in FIG. 12 the broken line 73 indicates a cover enclosing an entire slow descender, the purpose of which is to prevent the driving parts, such as gears and so on, from being exposed to the exterior and from being contaminated with dust or moisture. The cover can be made of an appropriate material and with an appropriate construction.

As is apparent from the above description, the slow descender according to this invention enables persons to descend with safety under various conditions and reduces the wear of the rope to the minimum.

Figure 14:
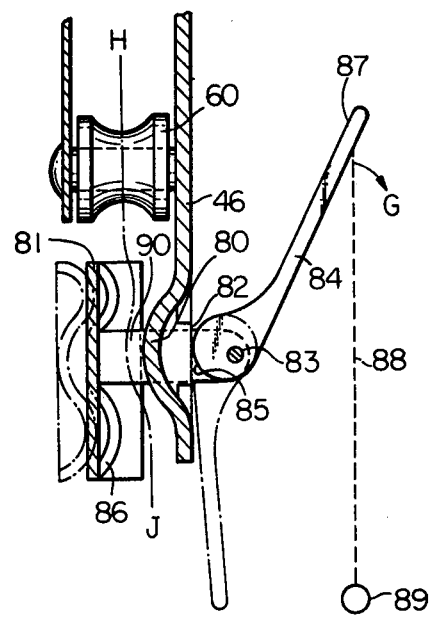
FIGS. 14 and 15 are drawings which show an example of a means for controlling the start of the slow descender by locking the rope.
Figure 15:
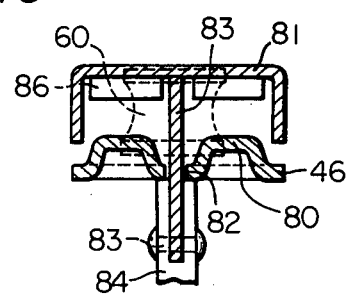

In utilizing the slow descender according to this invention, people will not feel any fear that the speed of the movement of the rope might become excessive, and moreover, they can easily keep themselves from starting the descent by using a simplified start controlling device. FIGS. 14 and 15 show one embodiment of such a start controlling device.

In FIG. 14, a supporting plate 46 extends below the guide pulley 60, and projections 80 are provided in the face of the normal running course of the rope. A holding plate 81 is so provided as to either approach the supporting plate 46 or retract therefrom. The holding plate 81 has an arm 90 which passes through a hole 82 in the supporting plate, and to one end of the arm 90 a lever 84 is fixed through a pin 83. On the lever 84 there is formed a cam face 85, so that when the lever 84 is turned in the direction indicated by arrow G as is shown in the drawing, the holding plate 81 will retract to the position shown by a chain line, and thereby a sufficient space for the rope to run between is formed between the holding plate 81 and the supporting plate 46. On the holding plate 81, there are also formed suitable projections 86 which cooperates together with the projections 80 on the supporting plate 46, and define a curved course H–J for holding the rope in the locking position shown with a solid line. The end portion 87 of the lever 84 is made wide enough to be readily grasped, and is also connected to a pulling string 88 having a gripping ball 89 at its end.

The illustrated device has a very simplified construction, but when the slow descender of this invention is equipped with the above device, in case of escape, it is possible to allow refugees to keep from starting the descending movement by holding the lever 84 in the position shown with the solid line, and also it is possible to start the descending movement, merely by pulling the string 88 to move the lever 84 from the position shown with the solid line to the position shown with the broken line. This device is also useful for exercise and training in using this slow descender.

Figure 16:
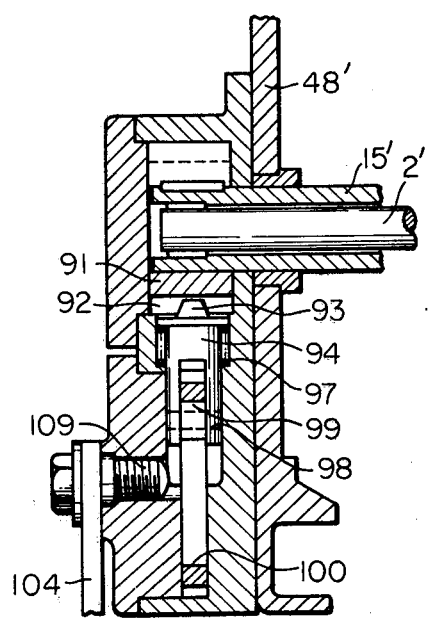
FIGS. 16, 17 and 18 are drawings which show a second example of a start controlling means which locks the rope pulley.
Figure 18:
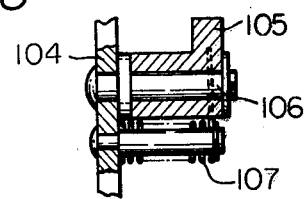
Figure 17:
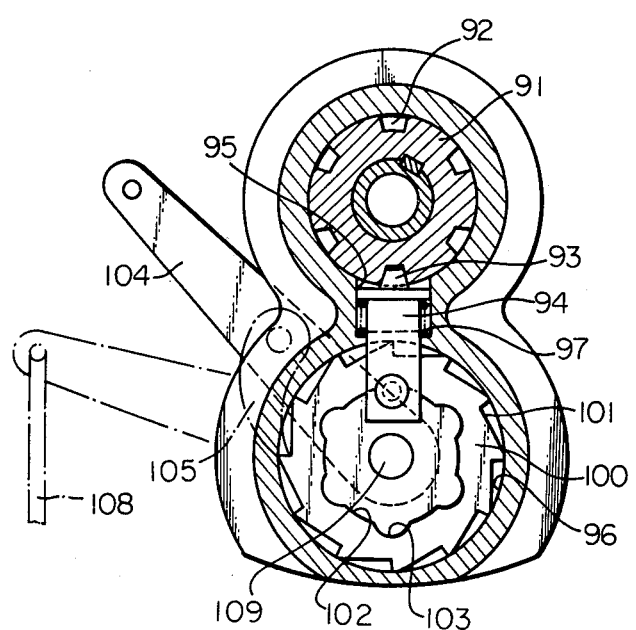

FIGS. 16, 17 and 18 show a second example of the start-stopping device. This device is suitable to be fixed, for example on the left end of the apparatus described in relation to FIG. 1, and the reference numerals 2', 15' and 48' correspond respectively to the pulley shaft 2, the sun gear 15 and the housing 48 in FIG. 1. Recesses 92 are provided in the axial direction on the periphery of a wheel 91 which is rotatably fixed on the axis of the sun gear 15'. A latch 94, having on its top a projection 93 engageable with the recess 92, is slidably provided within holes 95, 96 in the radial direction and is pushed against the wheel 91 by a spring 97. The lower end of the latch 94 is bifurcated as shown in FIG. 16, and a roller 99 is rotatably mounted by a pin 98 within the bifurcated section. Into the bifurcated section there is inserted a ratchet wheel 100 which has ratchet teeth 101 on its outer periphery. The ratchet wheel 100 is in the form of a plate, and is provided with concave portions 102 and convex portions 103 forming a cam face on its inner periphery. These concave-convex portions cooperate with the roller 99, carrying out a camming function, whereby the latch 94 moves forward and backward in the radial direction relative to the wheel 91. To turn the ratchet wheel 100, a lever 104 is provided, and a ratchet claw 105 fixed pivotably with a pin 106 is biased by a spring 107 (Ref. FIG. 18) so as to be always engaged with the external periphery of the ratchet wheel 100. A spring (not shown), always biases the lever 104 upward, to the position as shown in FIG. 17 by a solid line.

In FIG. 17, when the lever 104 is turned in the counterclockwise direction, for example by pulling a string 108, around the axis 109, the ratchet wheel 100 is turned by 1/12 the length of its circumference, and the roller is withdrawn against the spring 97 from engagement with the concave portion 102 to engagement with the convex portion 103, and the engagement between the latch 94 and the wheel 91 is released, thus the slow descender begins its movement. The lever 104 thereafter returns to the position shown with a solid line, and the ratchet claw 105 goes over a ratchet tooth 101 and is prepared for the driving of the next tooth. When the lever 104 is moved again in the counterclockwise direction, the ratchet wheel 100 is turned and the latch 94 is pushed toward the wheel 91 by the spring 97. When the wheel 91 turns and reaches a position where the peripheral recess 92 can be engaged with the projection 93, the latch 94 moves forward and stops the rotation of the wheel 91.

The mechanism which directly latches a driving shaft of a mechanical breaking means or a pulley shaft provides a reliable locking mechanism especially at the beginning of descent and also does not make injure the rope at all, making this brake very useful. Instead of the wheel 91 and the latch 94, it is also possible to provide a drum brake, a band brake, a disc brake or a cone brake etc., and also to operate the brake by a hand lever.

Figure 19:
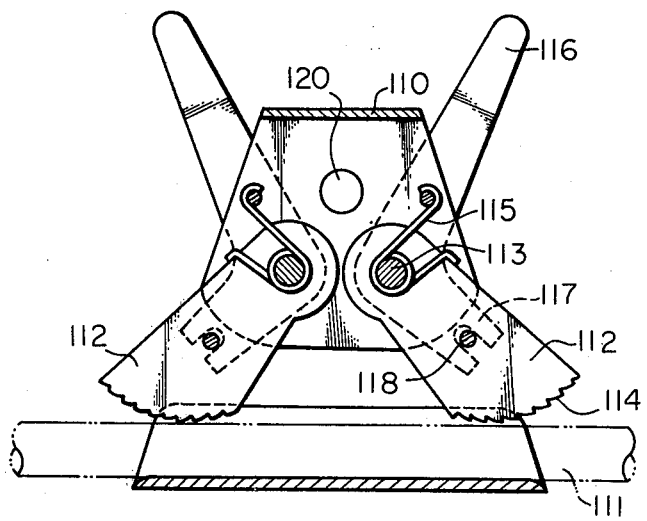
FIGS. 19 and 20 are drawings which show an example of an emergency lock fitting.
Figure 20:
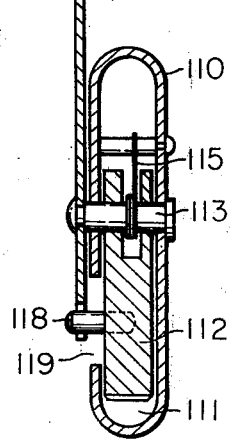

FIGS. 19 and 20 show a lock fitting for connecting to the rope for emergencies, which enables a person equipped with a safety belt and the lock fitting to descend by a slow descender. A casing 110 is formed to have a generally annular cross-section, and is fixed on the rope in an appropriate position under the body of the slow descender, and a rope 111 is guided as illustrated. An almost fan-shaped holding plate 112 is pivotably supported by a pin 113, and a side of the holding plate 112 is provided with small projections 114 as to be engaged with the rope. The holding plate 112 is biased by a spring 115 so that the small projections 114 can always be engaged with the rope. To release the engagement between the rope and the plate 112, a lever 116 is pivotably mounted by the pin 113, and a bifurcated portion 117 formed at the end of the lever 116 is engaged with the holding plate 112 by means of a pin 118. The casing 110 is provided with a cut out portion 119 to allow the insertion of the rope. The holding plate 112 is pushed in such a direction as to be always engaged with the rope 111. A pair of members 112–119 are provided in symmetrical positions on the casing 110.

In case of use, a descender who has bound his body with a safety belt fixed, for example, through a belt fixing hold 120, holds the lever 116, and inserts the rope into the position shown in FIG. 19 through the position adjacent to the cut off portion 119, and then releases the levers 116. The holding plates 112 approach the rope, and in whichever direction the rope may be pulled, either of the holding plates 112 secures the rope by the wedging action, and the fitting can be locked to the rope.

In this way, by previously binding people with a safety belt fixed to the lock fitting, it becomes possible to descend by fixing the lock fitting to the rope quite easily and reliably. Therefore the effectiveness of use of the slow descender can be remarkably increased. In some cases it takes more than 1 minute for an unfamiliar person to securely bind his body with a safety belt already fixed to the slow descender, but when using this fitting the belt-binding can be done in advance. By the way, some baskets and so on can be fixed to the fitting. After completing the descent, by gripping the levers 116 and thus releasing the fitting from the rope, one can quickly exit from the slow descender.

Usually in case of the descent using a slow descender, a rope is always apt to be whirled, owing to the twist of the rope and some force given outwardly.

Figure 21:
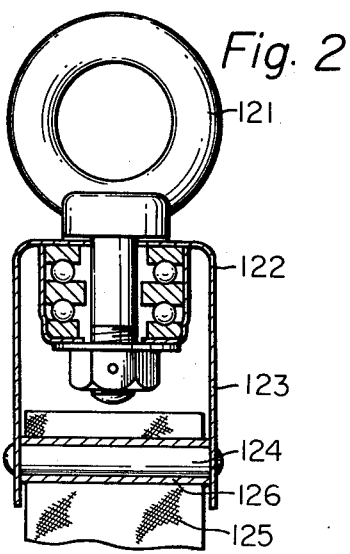
FIG. 21 is a drawing which shows an example of a whirl preventive device.

This is accordingly, a great deal of trouble in using the slow descender. According to this invention, this problem has been resolved by providing a whirl preventing device between the lower end of the rope and the belt. FIG. 21 shows an example of the whirl preventing device and 121 indicates a hanger bolt which is adapted to be fixed to the lower end of the rope in an appropriate manner. The hanger bolt 121 is connected with a hanger clasp 123 through a thrust bearing 122, and to the lower end of the hanger clasp 123 a belt 125 is fixed through a pin 124 and a sleeve 126. The thrust bearing 122 may be a ball bearing of the single row or double row type. Accordingly, it can be so made that only the load in the axial direction always acts on the thrust bearing. Thus even if a force is exerted on the rope that might cause it to be twisted, the person who descends with the belt binding his body is not affected by it. And as the rope itself is not affected by the turning force of the descending person, almost no whirling occurs during the descent.

In 20 performed tests, in which a weight of 200 kg was made to descend from a height of 15 meters, there was not recorded more than one turn, when using this device.

As it has become apparent by the foregoing description, the slow descender of this invention can not only be used for escape from a fire of a high-storied building and to secure the safety of human life, but also can be widely utilized for descending from a height. For example the slow descender is also useful for rescue of a sufferer in a falling accident in mountains, and for emergent escape from a rope way etc.

What I claim is:

1. In a slow descender of the type including a frame; means for connecting said frame to a building or the like; a rope pulley, rotatably mounted on a shaft supported on said frame, and adapted to guide around a portion of the periphery thereof a load supporting rope; and a braking apparatus for restricting the rotational speed of said rope pulley; the improvement wherein said braking apparatus comprises:

a mechanical braking means positioned on a first axial side of said rope pulley and comprising:
 a non-rotatable lining mounted on said frame and having a V-shaped friction braking surface;
 a rotatable centrifugal braking device including rotatable weights urgable by centrifugal force upon rotation into contact with said friction braking surface; and
 a mechanical accelerating device connecting said rope pulley and said centrifugal braking device and including a ring gear connected to said rope pulley to rotate therewith, plural intermediate planetary gears rotatably positioned on respective stationary shafts and meshing with said ring gear, and a sun gear meshing with each of said planetary gears and connected to said centrifugal braking device for rotating said weights; and an oil-hydraulic braking means positioned on a second axial side of said rope pulley and including an oil chamber sealed from the atmosphere, and a rotatable element drivably connected to said rope pulley and positioned in said oil chamber.

2. The improvement claimed in claim 1, wherein said centrifugal braking device is, non-rotatably mounted on said shaft.

3. The improvement claimed in claim 1, further comprising clutch means connected to said rope pulley and to said rotatable element of said oil-hydraulic braking means for interrupting the connection therebetween when the rotation speed of said rope pulley decreases below a predetermined value.

4. The improvement claimed in claim 3, wherein said oil chamber is eccentrically disposed about said shaft, and said rotatable element comprises a cylindrical rotor fixed to said shaft and having a plurality of radially movable vanes, said rotor being rotatable in said oil chamber.

5. The improvement claimed in claim 3, wherein said rotatable element comprises an inscribed gear pump type rotor.

6. The improvement claimed in claim 3, wherein said clutch means comprises a driving plate connected to said rope pulley, members fixed to said driving plate and presenting circumferentially oppositely directed hook portions, plural claw devices pivotally connected about axes fixed with respect to said shaft, and means on a periphery of said driving plate for urging a portion of said plural claws into engagement with a portion of said hooked portions when the rotation speed exceeds said predetermined value, thereby transferring rotation of said rope pulley to said shaft and to said rotatable element.

* * * * *